US008316148B2

(12) United States Patent
Ljunggren et al.

(10) Patent No.: US 8,316,148 B2
(45) Date of Patent: *Nov. 20, 2012

(54) METHOD AND APPARATUS FOR OBTAINING MEDIA OVER A COMMUNICATIONS NETWORK

(75) Inventors: Andreas Ljunggren, Vallingby (SE); Robert Skog, Hasselby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 186 days.

This patent is subject to a terminal disclaimer.

(21) Appl. No.: 12/918,341

(22) PCT Filed: Feb. 22, 2008

(86) PCT No.: PCT/EP2008/052186
§ 371 (c)(1),
(2), (4) Date: Aug. 19, 2010

(87) PCT Pub. No.: WO2009/103345
PCT Pub. Date: Aug. 27, 2009

(65) Prior Publication Data
US 2010/0332675 A1   Dec. 30, 2010

(51) Int. Cl.
*G06F 15/16* (2006.01)
*H04N 7/16* (2011.01)

(52) U.S. Cl. .......... 709/231; 709/219; 725/151; 725/32; 725/36; 707/818; 704/234; 704/246; 704/247; 704/251

(58) Field of Classification Search .................. 709/231, 709/219
See application file for complete search history.

(56) References Cited

U.S. PATENT DOCUMENTS

| 8,090,579 B2 * | 1/2012 | DeBusk et al. ............... 704/235 |
| 2010/0217785 A1 * | 8/2010 | Yun et al. ...................... 707/812 |
| 2010/0332621 A1 * | 12/2010 | Ljunggren et al. ............ 709/219 |
| 2010/0332675 A1 * | 12/2010 | Ljunggren et al. ............ 709/231 |

FOREIGN PATENT DOCUMENTS

| EP | 1643716 A1 | 4/2006 |
| WO | 2007/123283 A1 | 11/2007 |

OTHER PUBLICATIONS

Xu, D. et al. "On Peer-to-Peer Media Streaming." Proceedings of the 22nd International Conference on Distributed Computing Systems, Vienna, Austria, Jul. 2-5, 2002.

* cited by examiner

*Primary Examiner* — Jude Jean Gilles
(74) *Attorney, Agent, or Firm* — Coats & Bennett, P.L.L.C.

(57) ABSTRACT

A method and apparatus for obtaining a real time media stream provided as a plurality of media fragments from a plurality of remote nodes in a communications network. A first series of media fragments satisfying a first selection criterion is requested from a first remote node and a further series of media fragments satisfying a further different selection criterion is requested from at least one further remote node. When combined, the first series of fragments and the further series of fragments provide the complete media stream.

16 Claims, 9 Drawing Sheets

METHOD AND APPARATUS FOR OBTAINING MEDIA OVER A COMMUNICATIONS NETWORK

TECHNICAL FIELD

The invention relates to the field of obtaining media over a communications network, and in particular to obtaining IPTV media data.

BACKGROUND

TV services broadcast over an IP network are referred to as IPTV. IPTV is typically broadcast using a broadband access network, in which channels are transmitted over a broadband network from a super head-end down to an end-user's set top box (STB).

Linear content delivery, in which all channels in a subscription are simultaneously delivered to a user's set top box (STB), is not suitable for IPTV, as IPTV has limited bandwidth available over a broadband connection. A typical ADSL broadband connection provides a capacity of between 3 and 8 Mbps, and ADSL2 promises to deliver up to 25 Mbps downstream, whereas VDSL can provide a capacity of greater than 30 Mbps. Standard quality MPEG 2 IPTV content requires 2 Mbps per channel, and HDTV will require around 8-10 Mbps per channel. The MPEG 4 standard will approximately halve the bandwidth required to deliver IPTV content with the same quality. Nevertheless, the available bandwidth is a scarce resource, and IPTV solutions must limit the number of channels that can be delivered simultaneously.

FIG. 1 illustrates a known way of distributing media in which an IPTV media stream originates in a service provider network 1, is passed to a core network 2, is further passed into a metro network 3, and finally is sent via access networks 4 to each home network 5 that contains an STB that wishes to receive the media stream. Networks can quickly become saturated due to heavy traffic loads. In order to mitigate this problem, content can be multicast to reduce bandwidth demands for broadcast TV distribution. Furthermore, Video on Demand (VoD) services can be handled by VoD cache servers located close to the end-user. However, such caches require additional investment, and many routers would need to be replaced, as existing routers may not support IPTV multicasts.

It is known to distribute an IPTV service using a Peer to Peer (P2P) network, as illustrated in FIG. 2. Each STB is a peer in the network. An IPTV media stream can be delivered to a STB from another STB, from a media injector from which the stream originates, or from any other peer in the network.

An IPTV media stream is typically compressed in order to save bandwidth. An example of a compressed media format is MPEG. MPEG media streams contain different frames, such as I-frames, P-frames and B-frames. I-frames do not depend on data contained in the preceding or following frames, as they contain a complete picture. P-frames provide more compression than I-frames because they utilize data contained in the previous I-frame or P-frame. When generating a P-frame, the preceding frame is reconstructed and altered according to incremental extrapolation information. B-frame are similar to P-frames, except that B-frames interpolate data contained in the following frame as well as the preceding frame. As a result, B-frames usually provide more compression than P-frames. Typically, every 15th frame or so is an I-frame. P-frames and B-frames might follow an I-frame as follows: IBBPBBPBBPBB(I). The order and number of frames in the sequence can be varied.

Since B and P frames depend on adjacent frames it is necessary that when the STB receives a new channel, it receives a full I-frame before the new channel can be shown. The average time for switching between channels therefore depends on the length of time between I-frames. Typically, for MPEG-2 IPTV content, the length of time is around 0.5 seconds. For MPEG-4 part 10 IPTV content, the length of time between I-frames can be several seconds.

The media stream includes payload data and metadata. The payload data is the media data itself, and is decoded and shown by the receiver. Payload data typically comprises frames as described above. The metadata includes all other data in the media stream. This may be, for example, data describing the payload data, or information establishing signalling between two peers. In order to facilitate handling of the media stream, the media stream is sent in "fragments". Fragments are discrete portions of the media stream containing both the payload data and the metadata.

A buffer containing fragments is illustrated in FIG. 3. A fragment may contain both metadata about the media stream, and payload data from the media stream itself. A P2P logic function (in, for example, a STB) requests fragments from other P2P peers. In the example of FIG. 3 the P2P logic is writing fragment number 21 into the buffer and fragment number 17 is sent to the video decoder.

In multi-source networks such as P2P networks, a peer node obtains data by sending a request message to other peers and receiving a response, or by using Distributed Hash Tables (DHT). These methods require the sending of a large amount of metadata, for example to update other peer nodes with information such as which node has which data. This works well for obtaining static data over a P2P network or a redundant network, for example in file sharing applications or distributing VoD. However, for real time data transfer, such as IPTV broadcasts, this would lead to a large amount of metadata being sent which could reduce the effective bandwidth of the network. For example, using DHT updates, a large number of messages would be sent to inform the requesting peer that the requested peer has "no such packet".

SUMMARY

The inventors have realised the problems associated with the prior art and devised an apparatus and method to reduce the amount of overhead packets in the form of metadata sent in a multi-source network such as a P2P or a redundant network. A selective subscription mechanism is used to achieve a high utilization with a minimal overhead for control traffic.

According to a first aspect of the invention, there is provided a method of obtaining a real time media stream provided as a plurality of media fragments from a plurality of remote nodes in a communications network. A first series of media fragments satisfying a first selection criterion is requested from a first remote node and a further series of media fragments satisfying a further different selection criterion is requested from at least one further remote node. When combined, the first series of fragments and the further series of fragments provide the complete media stream. In this way, load balancing can be performed, for example where the requesting node requests all odd numbered fragments from the first remote node and all even numbered fragments from the second remote node. Note that the request is not just for fragments currently residing in the buffers of the remote nodes, but is more like a subscription for all fragments matching the selection criteria that the remote nodes will receive.

As an option, the selection criteria are used to select each media fragment based on a sequence number of each fragment. Examples of such selection criteria include selecting all media fragments having a sequence number matching a cyclic function, and selecting all media fragments having a sequence number matching a modulus function.

As an alternative option, the selection criterion comprises selecting media fragments containing data of a predetermined type. Examples of media fragments containing data of a predetermined type include media fragments containing data selected from any of I-frames, P-frames and B-frames. This is advantageous where the requesting node has knowledge that a remote node is only receiving fragments containing data of a predetermined type. For example, the remote node may only be subscribing to I-frames, in which case that node can be used to provide I-frames and other nodes can be used to provide other frames.

Optionally, the method comprises balancing a load on the communications network by selectively requesting media fragments from particular remote nodes using the selection criteria. This allows more efficient use of network resources and reduces the risk of disruption to the media stream.

As an option, the communications network is a Peer to Peer communications network. However, the method equally applies to other types of network in which the same reasl time media stream can be obtained from more than one source.

According to a second aspect of the invention, there is provided a node for use in a communications network. The node comprises a logic function for determining a first selection criterion for a first required series of media fragments and a further different selection criterion for a further required series of media fragments. The selection criteria are chosen such that when combined, the first series of fragments and the further series of fragments provide a complete real time media stream. The node is also provided with a transmitter for requesting the first series of media fragments satisfying the first selection criterion from a first remote node, and the further series of media fragments satisfying the further different selection criterion from at least one further remote node. The node further comprises a receiver for receiving the requested media fragments and a buffer for storing the received fragments. Optionally, the node is a Set Top Box in which case it may also be provided with a media renderer. As a further option, the node is a proxy node arranged to act on behalf of a Set Top Box.

According to one option, the logic function is arranged to use selection criteria based on a sequence number of each media fragment. Examples of such selection criteria include selecting media fragments having a sequence number matching a cyclic function, and selecting media fragments having a sequence number matching a modulus function. Alternatively, the logic function is arranged to use selection criterion based on media fragments containing data of a predetermined type, for example media fragments containing I-frames, P-frames or B-frames.

Optionally, the logic function is arranged to balance a load on the communications network by selectively requesting media fragments from particular remote nodes using the selection criteria, in order to improve the efficiency of the network and reduce the risk of disruption to the real time media stream.

According to a third aspect of the invention, there is provided a node for use in a communications network. The node is provided with a receiver for receiving from a remote note a request that includes a selection criterion. The selection criterion is used for selecting a series of media fragments that form part of a media stream. A logic function at the node is provided for processing the request and determining media fragments matching the selection criterion, and a transmitter is provided for sending the media fragments to the remote node. In this way, all media fragments received at the node that match the selection criterion will be send to the remote node that sent the request.

According to a fourth aspect of the invention, there is provided apparatus for use in receiving media over a communications network, the apparatus comprising means for performing the method described above in the second aspect of the invention.

According to a fifth aspect of the invention, there is provided a program for controlling an apparatus to perform the method described above in the second aspect of the invention.

According to a sixth aspect of the invention, there is provided a program which, when loaded into an apparatus, causes the apparatus to become an apparatus as described above in the third aspect of the invention.

According to a seventh aspect of the invention, there is provided a program described above in either of the fourth or fifth aspects of the invention, carried on a carrier medium. The carrier medium is optionally a storage medium.

According to an eighth aspect of the invention, there is provided a storage medium containing a program as described above in either of the fourth or fifth aspects of the invention.

DETAILED DESCRIPTION

The following description sets forth specific details, such as particular embodiments, procedures, techniques, etc. for purposes of explanation and not limitation. In some instances, detailed descriptions of well known methods, interfaces, circuits, and devices are omitted so as not obscure the description with unnecessary detail. Moreover, individual blocks are shown in some of the drawings. It will be appreciated that the functions of those blocks may be implemented using individual hardware circuits, using software programs and data, in conjunction with a suitably programmed digital microprocessor or general purpose computer, using application specific integrated circuitry, and/or using one or more digital signal processors.

Figure 1:
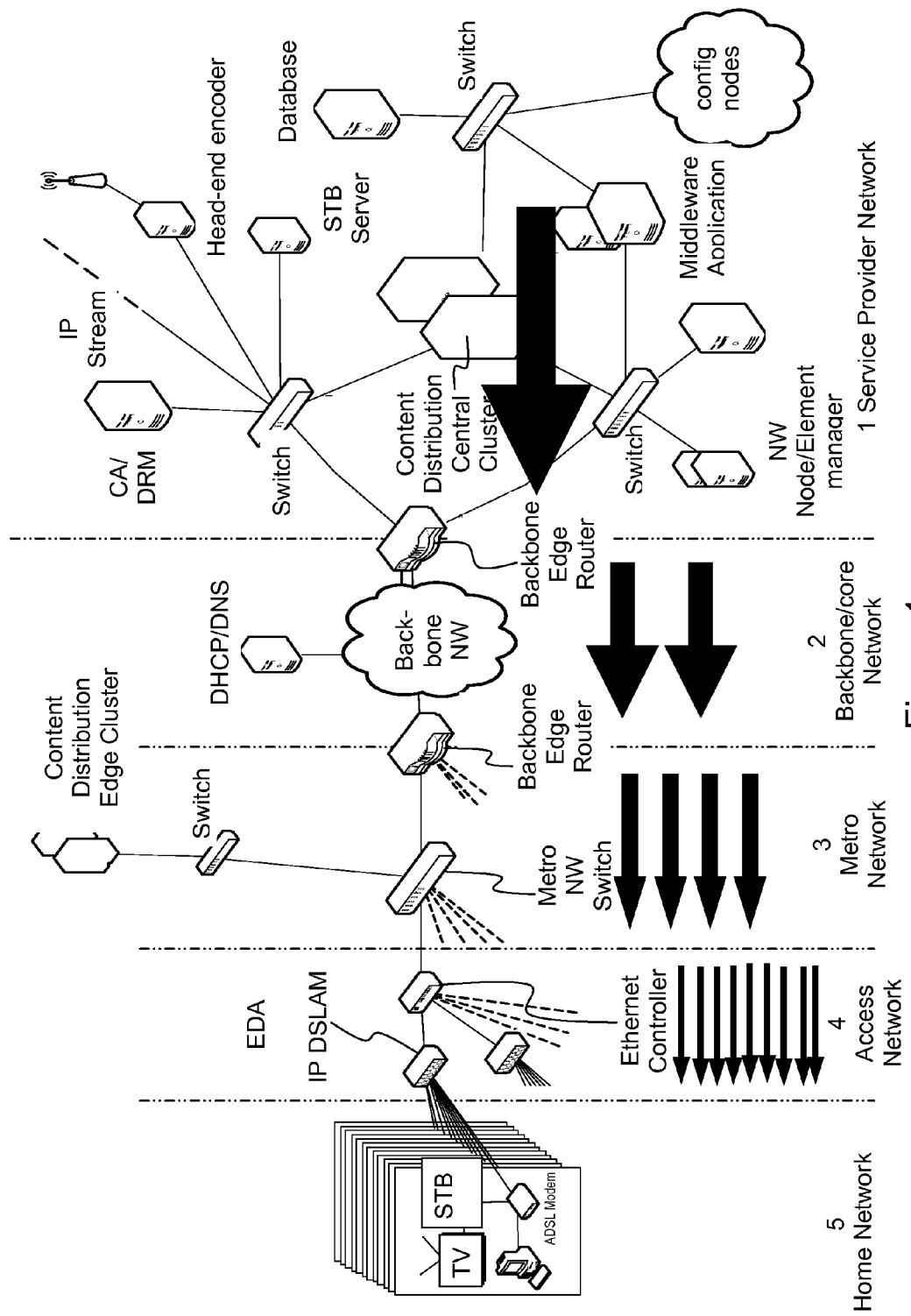
FIG. 1 illustrates schematically in a block diagram an architecture for the distribution of IPTV.
Figure 2:
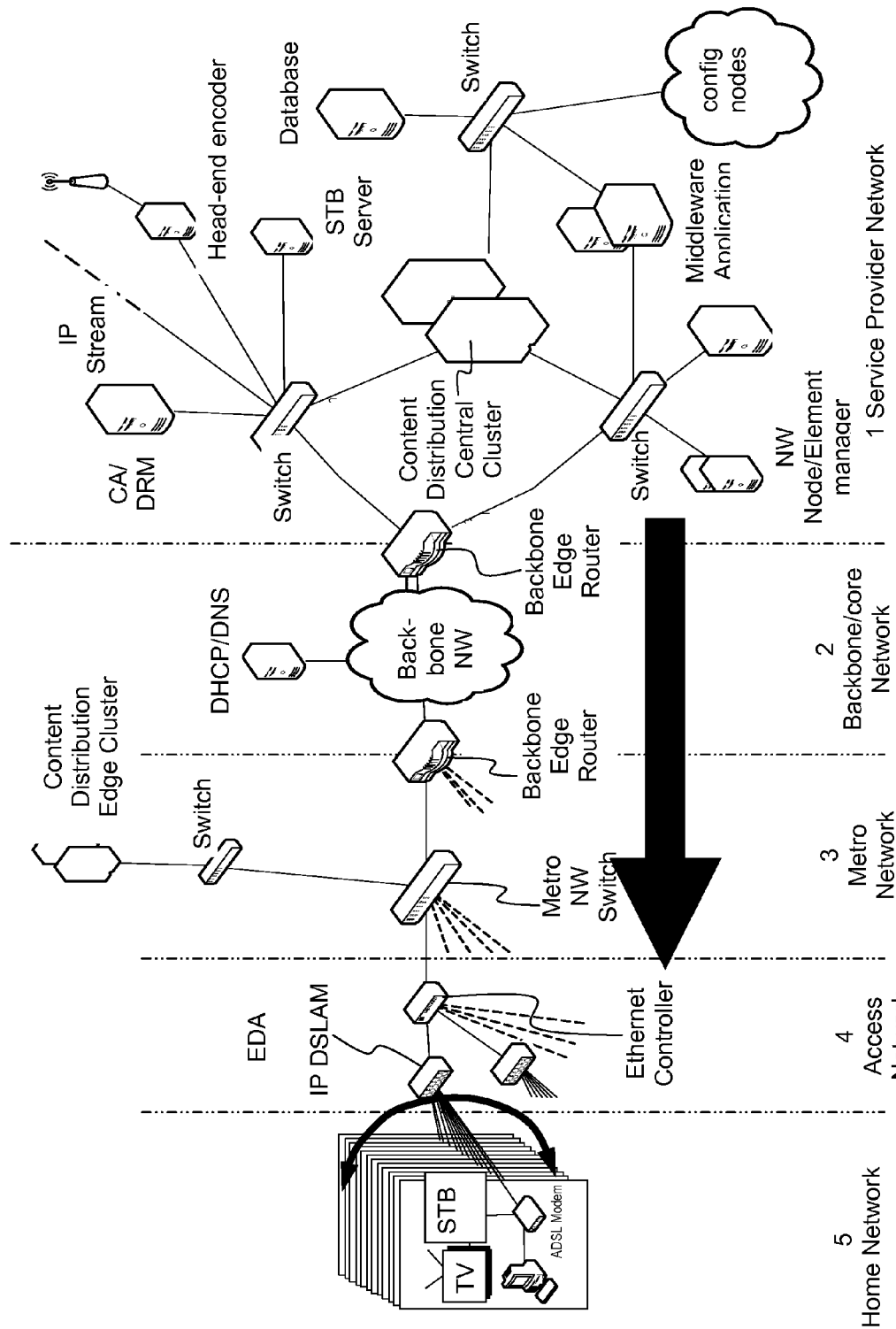
FIG. 2 illustrates schematically in a block diagram an architecture for the distribution of IPTV in a peer to peer network.
Figure 3:
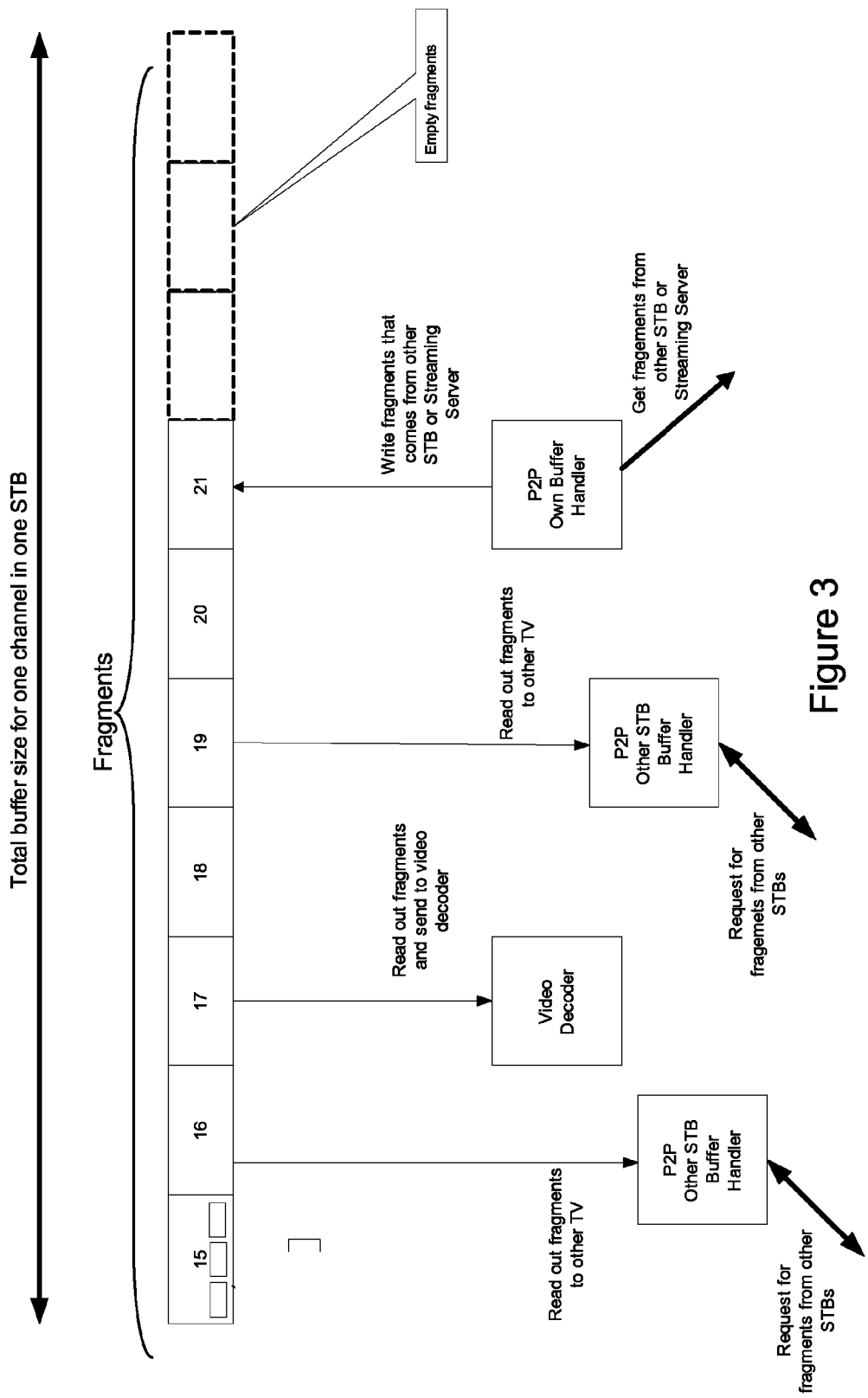
FIG. 3 illustrates schematically in a block diagram a buffer in a STB containing data fragments.
Figure 4:
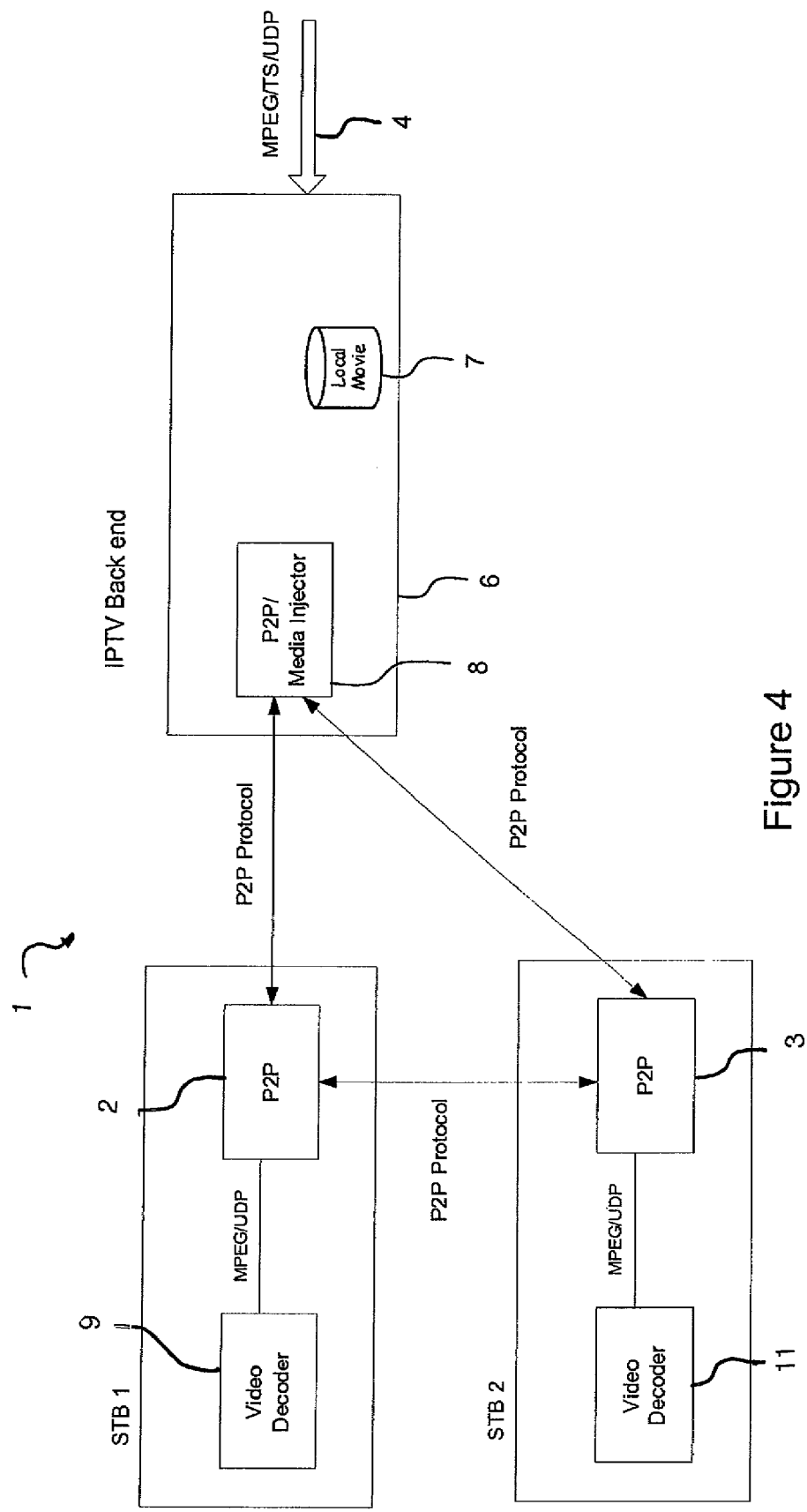
FIG. 4 illustrates schematically in a block diagram a media injector and two Set Top Boxes.

In this description, reference is made to key frames. An example of a key frame is an I-frame in the MPEG format. However, it will be appreciated by persons of skill in the art that the invention applies to any key data for the media stream. Examples of data that may be stored in a key frame include any of:

Icecast with ID3 tagging
Ogg-tagging
MPEG I-frames
Possible B frames in x.264
Making sure that the header survives in MJPEG
Header of RTP (if RTP runs on top of P2P)
Closed Caption subtitles
Encryption information IPTV P2P requires a media injector in order to introduce the IPTV media stream into the network, although the media injector is not a true peer in the network in the sense that it sends media data but does not receive media data from the peers. This is illustrated in FIG. 4, which is a schematic representation of a simple IPTV P2P network 1. The network 1 includes an IPTV server 6 and two STBs STB1 and STB2. Each STB includes a P2P network interface 2, 3 to which is connected a video decoder 9, 11. In this example, STB1 receives the IPTV media stream from both STB2 and the IPTV Server 6, which injects either streaming content 4 or content from a database 7 using a P2P media injector 8. Note that other network nodes (in addition to STBs) may be peers in the network.

Figure 5:
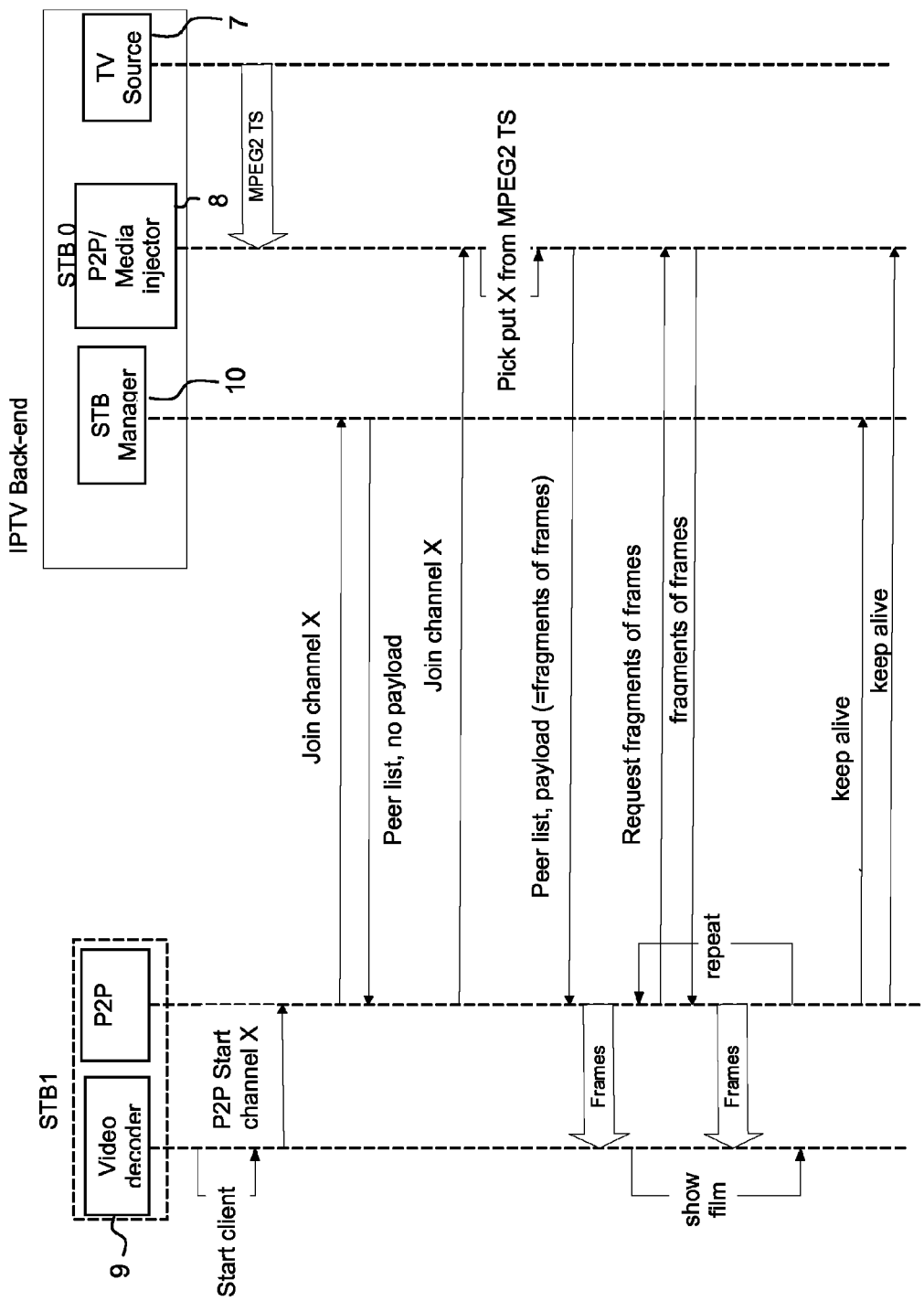
FIG. 5 illustrates schematically in a block diagram the signalling required to initiate an IPTV broadcast with a first Set Top Box.

FIG. 5 illustrates typical signalling required to initiate an IPTV broadcast with a first STB STB1. The video decoder 9 in STB1 receives an instruction from a user to start channel X. This is relayed to the P2P network interface 2 in STB1, which sends a request to a STB manager 10 in the IPTV back-end to join channel X. The STB Manager 10 returns a peer list to the P2P function in STB1, but no IPTV media stream. The peer list includes the P2P media injector 8. Since the media injector can be considered as a peer in the network, it is termed STB0. The P2P function in STB1 then sends a request to join channel X to STB0. STB0 receives an IPTV media stream from an IPTV media stream source (for example, from the database 7), and sends a peer list and an IPTV media stream comprising fragments of frames to the P2P network interface of STB1. The P2P network interface of STB1 sends the frames to the video decoder 9 in STB1, which can then show the IPTV media stream to the user.

Figure 6:
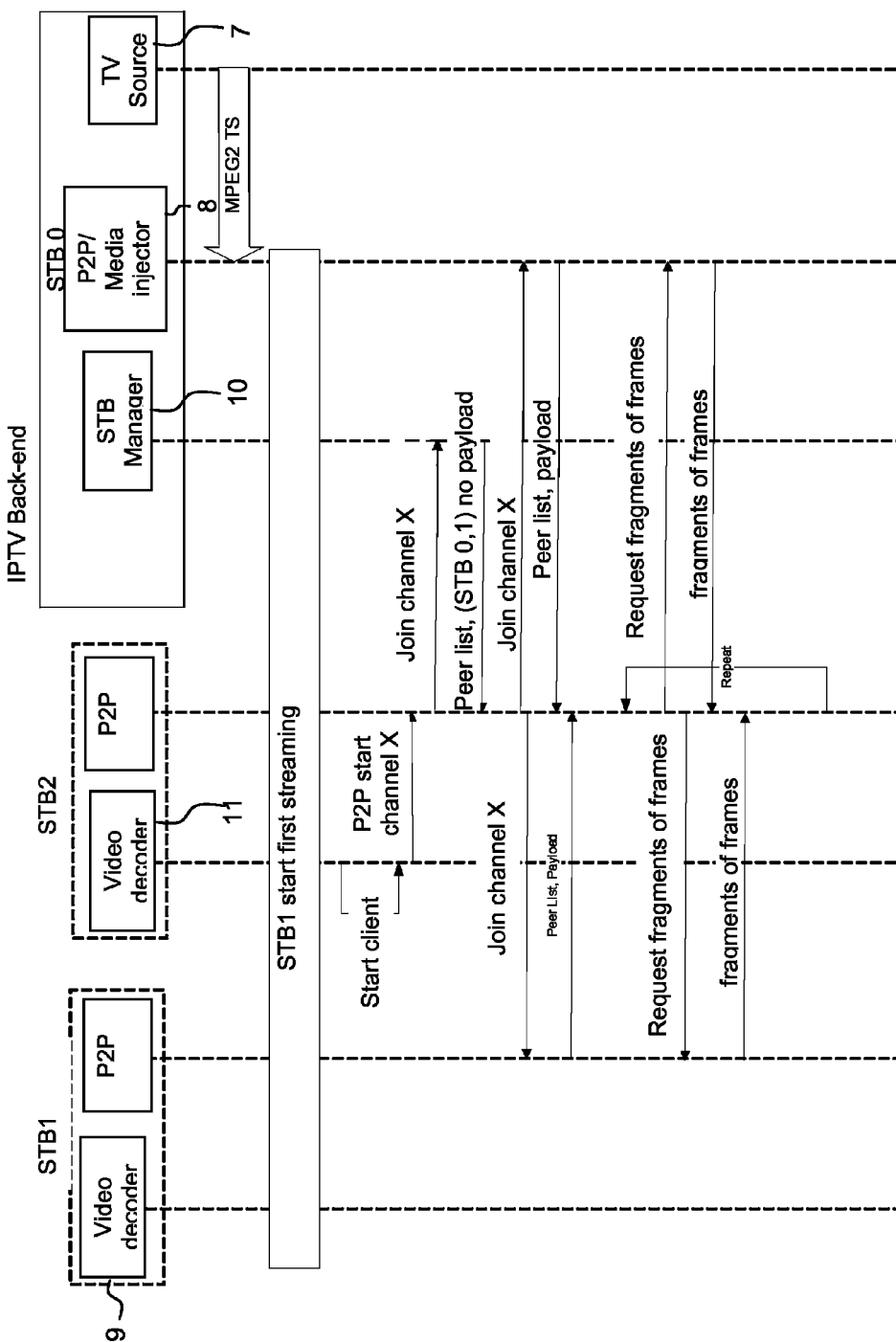
FIG. 6 illustrates schematically in a block diagram the signalling required to initiate an IPTV broadcast with a further Set Top Box.

FIG. 6 illustrates typical signalling required to initiate an IPTV broadcast with a further STB STB2. It is assumed that STB1 is already receiving an IPTV media stream from STB0. When the user of STB2 wishes to receive channel X, she sends an instruction to logic within STB2, which is relayed to a P2P network interface in STB2. The P2P network interface in STB2 sends a request join channel X to the STB manager 10. The STB manager 10 returns a peer list but no payload to STB2. The peer list includes STB0 and STB1, as these are both possible sources for the IPTV media stream. The P2P function in STB2 then sends a request to each of STB0 and STB1 to join channel X. STB0 and STB1 each send a peer list and IPTV data stream to the P2P network interface in STB2, which passes the frames of the IPTV media stream to the video decoder.

Figure 7:
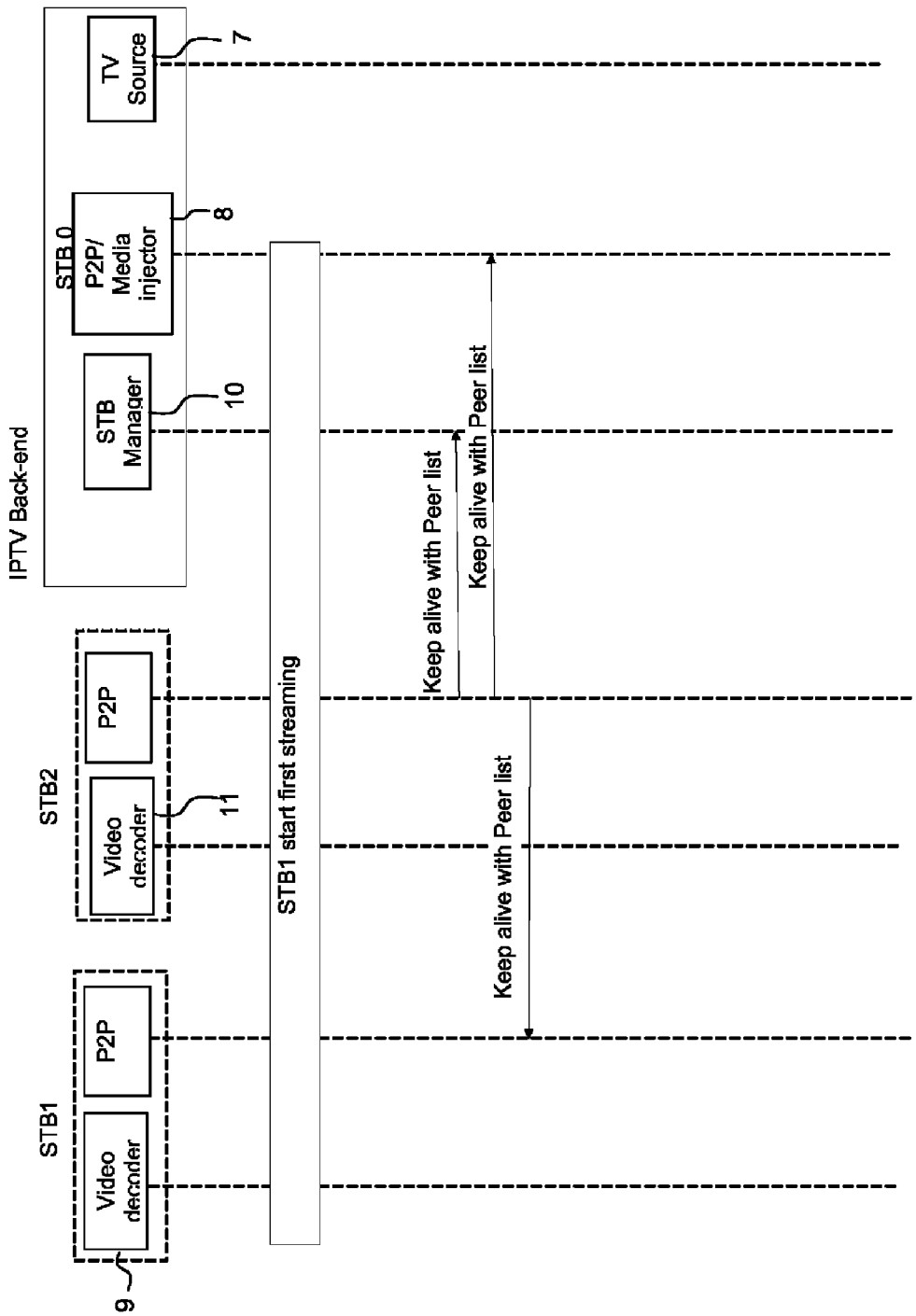
FIG. 7 illustrates schematically in a block diagram keep alive messages sent by a Set Top Box.

It is advantageous for all peers in the P2P network to send each other "keep alive" messages, as illustrated in FIG. 7, to ensure that each STB is included in the list of peers and can both send and receive IPTV media streams.

Note that the term "IPTV media stream" is used herein to refer to any kind of media data having real time requirements, and includes user defined TV content, interactive TV, interactive or co-operative games, or audio media. The media stream is to be delivered to the user such that the user can observe the media content at a constant rate without interruptions or delays. There is some latency in the P2P network, caused by buffers in each STB and the time it takes to establish communication between peers. The term "media stream" need not necessarily refer to the media data injected into the network by a media injector, but can also be used to refer to media data received from other peers in a P2P network.

As described above, a request/response or DHT method is typically used to request content from other peers in a P2P network, but the dynamic nature of data storage in an IPTV network means that metadata overheads using these methods would be very large. However, whilst the following description refers to peers in a P2P network receiving IPTV media streams, the method can equally apply to obtaining "static" data such as VoD or in file sharing applications.

All fragments in a media stream have sequence numbers. The invention makes use of the sequence numbers in order to request specific fragments from specific peer nodes in the P2P network. When a peer in a P2P IPTV network requests data from other peers, it requests specific fragments referred to by sequence number from specific peers that the peer knows can provide those fragments. The requests are initiated by P2P logic within the peer. The request uses selection criteria to request fragments having a sequence number that matches a selection criterion. The request can be thought of as a subscription, so that the peer that receives the request knows that the requesting peer requires not only the fragments currently stored in the peer's buffer that match the selection criterion, but all future fragments that the peer receives that match the selection criterion.

The P2P logic can also perform load balancing by requesting certain fragments from certain peers. This reduces the amount of network traffic, as it will prevent all peers from receiving a request message from sending all of the fragments. There are different ways of requesting particular fragments, as illustrated in FIG. 8.

Figure 8:
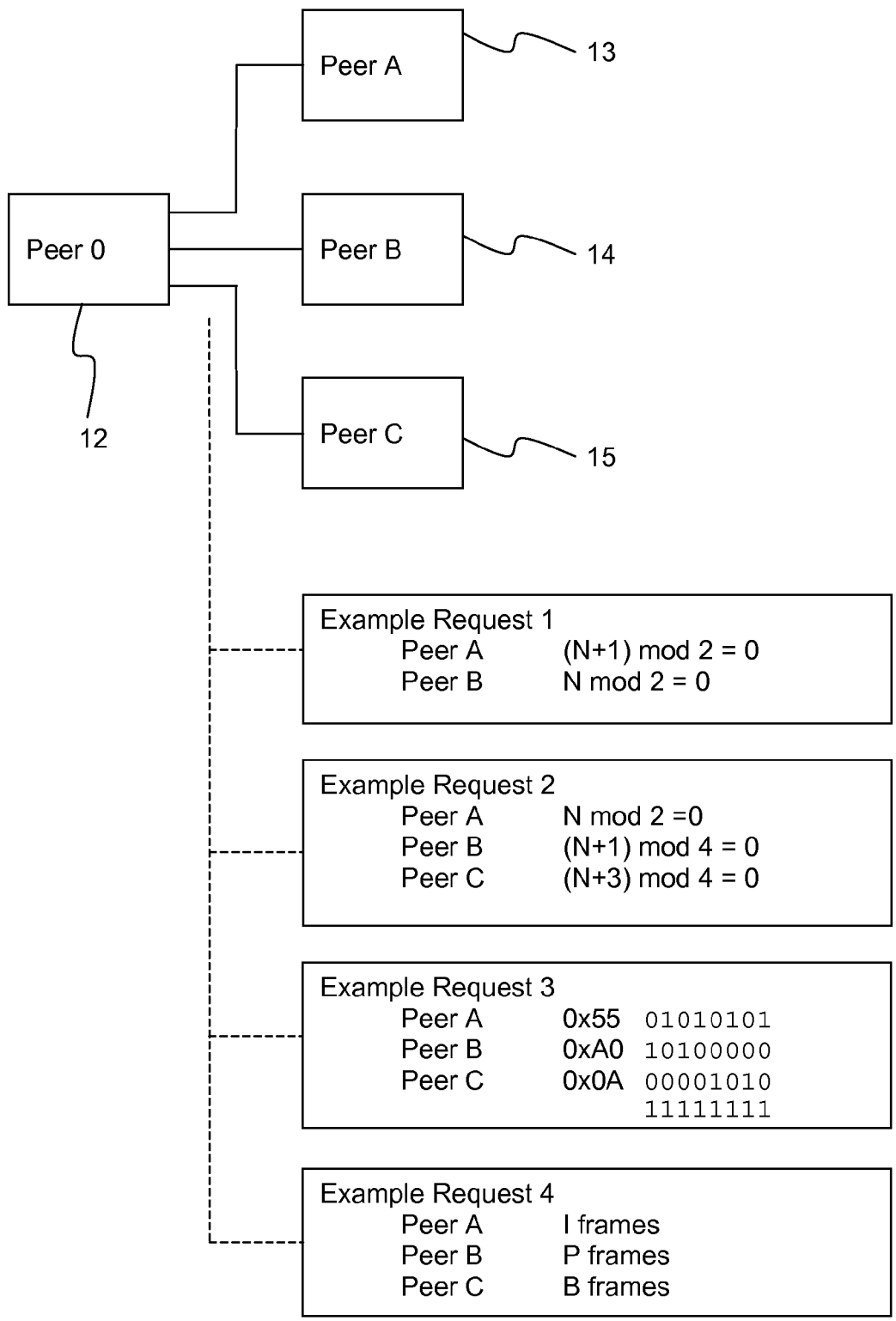
FIG. 8 illustrates schematically in a block diagram example requests from a peer node to other per nodes in a communications network.

FIG. 8 shows a peer 12 that is connected to three other peers, peer A 13, peer B 14 and peer C 15.

In a first example, the peer 12 requires fragments to be sent from peer A 13 and peer B 14. The request that the peer sends uses modulus mathematics to subscribe to odd numbered fragments from peer A 13 (fragments matching $(N+1) \bmod 2=0$, where N is a media fragment sequence number) and even numbered fragments from peer B 14 (fragments matching $N \bmod 2=0$). The load is therefore balanced evenly between peer A 13 and peer B, and the requesting peer receives all of the media fragments that it needs.

In a second example, the peer 12 has three neighbours, peer A 13, peer B 14 and peer C 15, and the required load balancing is 50%, 25%, 25% between peers A, B and C respectively. The peer 12 sends a request to peer A 13 for "Fragments matching $N \bmod 4 < 2$", a request to peer B 14 for "Fragments matching $(N+2) \bmod 4=0$", and a request to peer C 15 for "Fragments matching $(N+3) \bmod 4=0$" from C. Alternatively, a more advanced commutation can be applied such as "$N \bmod 2=0$", "$(N+1) \bmod 4=0$","$(N+3) \bmod 4=0$)" which gives the same load balancing, but better interleave.

It will be apparent the multiple rules can be used for requesting media fragments, giving more advanced patterns and sophisticated load balancing as required.

An alternative to modulus mathematics is to use a cyclic function, as illustrated by Request example 3 in FIG. 8. The peer may transmit a cyclic function to the neighbouring peers from which it is requesting media fragments, and the neighbouring peers only send fragments with sequence numbers corresponding to the cyclic function. In this example a load balancing of 50%, 25%, 25% is required between peers A, B and C respectively, and an 8 bit subscription pattern is used. The peer 12 subscribes to 0x55 from peer A (which corresponds to a binary 01010101), 0xA0 from peer B (which corresponds to 10100000) and 0x0A from peer C (which corresponds to 00001010). Each peer only sends media fragments in a cycle corresponding to the binary 1 in the subscription, and so the peer 12 receives all of the requested media fragments and the network load is balanced as required.

It is also possible to subscribe only to certain types of media fragment, as illustrated in Request example 4 in FIG. 8. In this example, a neighbouring peer 13 may be receiving only I frames for Channel 4 in order to show a representation of Channel 4 in a Picture in Picture (PiP application). The peer 12 may therefore request only media fragments containing I frame data from peer A 13, and media fragments containing P and B frame data from peer B 13 and peer C 12. This type of request may be used to request all fragments in the media stream containing key frame data of a specified type. This may be used, for example, to obtain fragments containing key frame data from a reliable remote node, and to request fragments that do not contain key frame data from a less reliable remote node. This minimizes disruption to the real time media stream when rendered for the user, but can be useful for load balancing.

Figure 9:
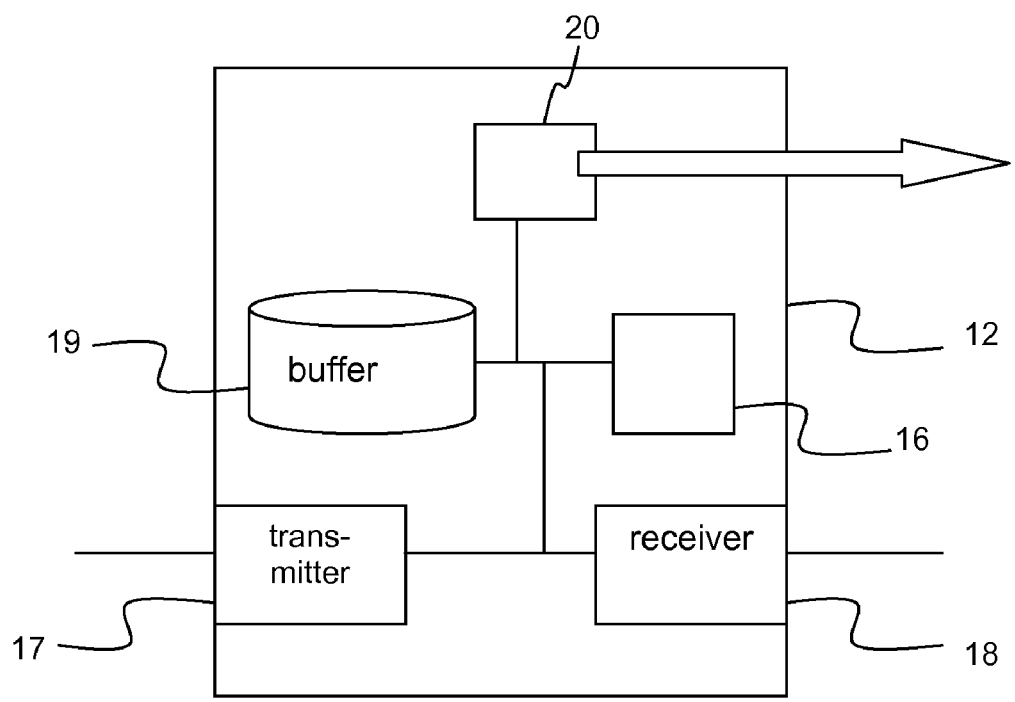
FIG. 9 illustrates schematically in a block diagram a peer node according to an embodiment of the invention.

Referring to FIG. 9 herein, there is illustrated schematically in a block diagram a peer node according to an embodiment of the invention. The peer node 12 comprises a P2P logic function 16 for initiating requests for media fragments from other peer nodes. A transmitter 17 is provided for sending the request for a series of fragments, and a receiver 18 is provided for receiving the fragments from other peer nodes. The node 12 comprises a buffer 19 for storing the received media fragments, and may also comprise a media renderer 20 for rendering the received fragments. The node is typically an STB, but may be any node in the network, for example a proxy acting on behalf on an STB, in which case the media renderer 20 may not be provided.

FIG. 9 can also be used to illustrate an example of a peer node that receives a request for a series of media fragments. The buffer 19 is a memory for storing a plurality of fragments, and the receiver 18 receives a request from a requesting peer node. The request includes a selection criterion for selecting a series of media fragments. The logic function 16 is used to process the request and determine which media fragments match the selection criterion. The transmitter 17 is used to send the determined media fragments to the requesting node. All subsequent fragments that arrive in the buffer will also be sent to the requesting node.

The invention reduces the amount of DHT or Request traffic, leading to a more efficient use of available bandwidth. Furthermore, the propagation speed of packets in a multi hop network is minimized, because there is no wait for requests as the packets can be forwarded instantly. Accelerators can behave like hot-potato routers, thus minimizing the memory consumption. The invention is suitable for use in obtaining both dynamic streaming data such as IPTV content, in addition to static data such as VoD. However, it should be noted that it is particularly suited to obtaining dynamic streaming data because the data in each peer's buffer is constantly changing, and the amount of signalling required to inform other peer nodes of available media fragments is minimized.

Although various embodiments have been shown and described in detail, the claims are not limited to any particular embodiment or example. None of the above description should be read as implying that any particular element, step, or function is essential such that it must be included in the claims' scope. The scope of protection is defined by the claims. For example, the invention has been described with respect to dynamic streamed IPTV media distributed via a P2P network. However, it can be used in any network where the data is obtained from multiple sources.

The invention claimed is:

1. A method of obtaining a real time media stream provided as a plurality of media fragments from a plurality of remote nodes in a communications network, the method comprising:
    requesting a first series of media fragments from a first remote node by transmitting a request comprising a first selection criterion to the first remote node; and
    requesting a further series of media fragments from at least one further remote node by transmitting at least one further request comprising a further different selection criterion to the at least one further remote node, wherein when combined, the first series of fragments and the further series of fragments provide the complete media stream.

2. The method of claim 1, wherein the selection criteria are arranged to select each media fragment based on a sequence number of each fragment.

3. The method of claim 2, wherein the selection criteria include all media fragments having a sequence number matching a cyclic function.

4. The method of claim 2, wherein the selection criteria include all media fragments having a sequence number matching a modulus function.

5. The method of claim 1, wherein a selection criterion comprises selecting media fragments containing data of a predetermined type.

6. The method of claim 5, wherein the predetermined type includes media data selected from any of I-frames, P-frames and B-frames.

7. The method of claim 1, further comprising balancing a load on the communications network by selectively requesting media fragments from particular remote nodes using the selection criteria.

8. The method of claim 1, wherein the communications network is a Peer to Peer communications network.

9. A node operative in a communications network, the node comprising:
    a logic function operative to determine a first selection criterion for a first required series of media fragments and a further different selection criterion for a further required series of media fragments, such that when combined, the first series of fragments and the further series of fragments provide a media stream;
    a transmitter operative to transmit a request comprising the first selection criterion to a first remote node, and a further request comprising the further selection criterion to at least one further remote node;
    a receiver operative to receive media fragments; and
    a buffer operative to store the received fragments.

10. The node of claim 9, wherein the node is selected from the group consisting of a Set Top Box and a proxy node arranged to act on behalf of a Set Top Box.

11. The node of claim 9, wherein the logic function is operative to use selection criteria based on a sequence number of each media fragment.

12. The node of claim 11, wherein the selection criteria is selected from the group consisting of media fragments having a sequence number matching a cyclic function, and media fragments having a sequence number matching a modulus function.

13. The node of claim 9, wherein the logic function is operative to use selection criterion based on media fragments containing data of a predetermined type.

14. The node of claim 9, wherein the logic function is operative to balance a load on the communications network by selectively requesting media fragments from particular remote nodes using the selection criteria.

15. A node operative in a communications network, the node comprising:
- a receiver operative to receive from a remote note a request, the request including a selection criterion for selecting a series of media fragments, the series of media fragments forming part of a media stream;
- a logic function operative to process the request and determine media fragments arriving at the node matching the selection criterion; and
- a transmitter operative to send the determined media fragments to the remote node.

16. A non-transitory machine readable medium including program logic comprising machine executable code operative to cause a node in a communications network to obtain a real time media stream provided as a plurality of media fragments from a plurality of remote nodes in the network by performing the steps of:
- requesting a first series of media fragments from a first remote node by transmitting a request comprising a first selection criterion to the first remote node; and
- requesting a further series of media fragments from at least one further remote node by transmitting at least one further request comprising a further different selection criterion to the at least one further remote node, wherein when combined, the first series of fragments and the further series of fragments provide the complete media stream.

\* \* \* \* \*

UNITED STATES PATENT AND TRADEMARK OFFICE
CERTIFICATE OF CORRECTION

PATENT NO. : 8,316,148 B2
APPLICATION NO. : 12/918341
DATED : November 20, 2012
INVENTOR(S) : Ljunggren et al.

Page 1 of 1

It is certified that error appears in the above-identified patent and that said Letters Patent is hereby corrected as shown below:

On the Title Page, in Item (75), under "Inventors", in Column 1, Line 1, delete "Vallingby (SE);" and insert -- Vällingby (SE); --, therefor.

On the Title Page, in Item (75), under "Inventors", in Column 1, Line 2, delete "Hasselby (SE)" and insert -- Hässelby (SE) --, therefor.

In the Specifications:

In Column 1, Lines 16-17, delete "set top box (STB)." and insert -- Set Top Box (STB). --, therefor.

In Column 1, Lines 19-20, delete "set top box (STB)," and insert -- Set Top Box (STB), --, therefor.

In Column 3, Line 25, delete "reasl" and insert -- real --, therefor.

In Column 3, Line 64, delete "remote note" and insert -- remote node --, therefor.

In Column 5, Line 14, delete "information" and insert -- information. --, therefor.

In Column 5, Line 30, delete "STB STB1." and insert -- STB, STB1. --, therefor.

In Column 5, Line 47, delete "STB STB2." and insert -- STB, STB2. --, therefor.

In Column 7, Line 18, delete "peer B 13 and peer C 12." and insert -- peer B 14 and peer C 15. --, therefor.

In the Claims:

In Column 9, Line 10, in Claim 15, delete "remote note" and insert -- remote node --, therefor.

Signed and Sealed this
Fourteenth Day of May, 2013

Teresa Stanek Rea
*Acting Director of the United States Patent and Trademark Office*